Patented May 6, 1941

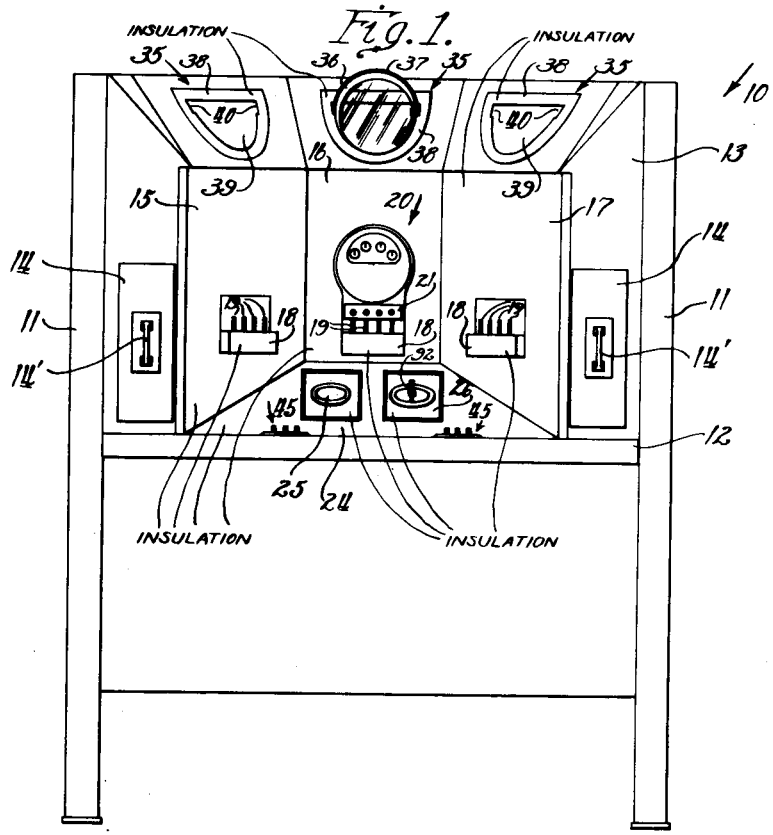
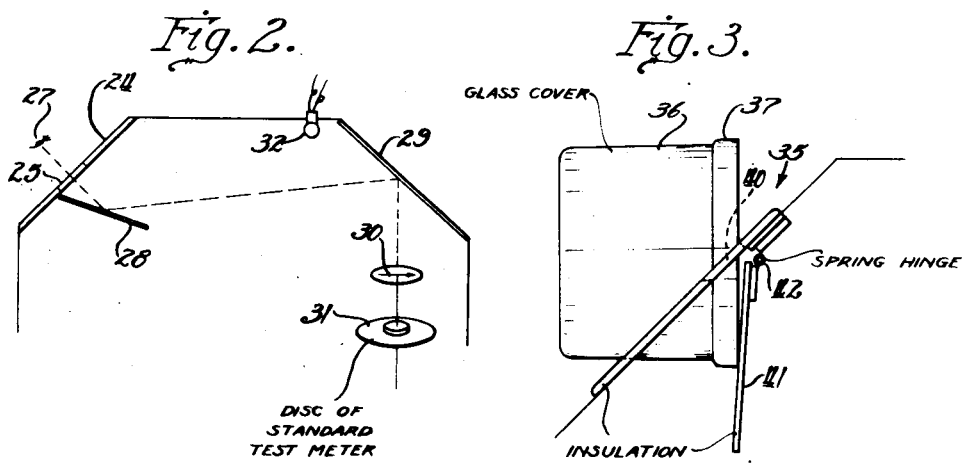

2,241,181

UNITED STATES PATENT OFFICE 2,241,181

METER TESTING APPARATUS

Robert J. Bushnell, La Grange, Ill.

Application August 19, 1940, Serial No. 353,156

9 Claims. (Cl. 175—183)

My invention relates, generally, to electrical testing apparatus and it has particular relation to apparatus for testing induction disc type watthour meters.

An object of my invention is to provide for simultaneously testing a plurality of watthour meters.

Another object of my invention is to provide for simultaneously comparing the operation of a plurality of watthour meters with a standard watthour meter.

A further object of my invention is to provide for energizing a plurality of watthour meters to be tested during a predetermined number of revolutions of the disc of a standard watthour meter.

Still another object of my invention is to provide for deenergizing a watthour meter under test when the disc of a standard watthour meter occupies a predetermined position.

It is another object of my invention to provide for counting the number of revolutions of the disc of a standard watthour meter used for testing watthour meters and for deenergizing the watthour meters being tested after a predetermined number of revolutions of the disc of the standard meter.

A still further object of my invention is to provide for mounting watthour meters to be tested, together with means for receiving the covers of the watthour meters for holding the same while the meters are being tested.

Other objects of my invention will, in part, be obvious and in part appear hereinafter.

For a more complete understanding of the nature and scope of my invention, reference may be had to the following detailed description taken in connection with the accompanying drawings in which:

Figure 1 is a view, in front elevation, of a test bench arranged to receive a plurality of watthour meters to be tested;

Figure 2 illustrates diagrammatically the optical system that is employed for viewing the operation of the standard test meter;

Figure 3 is a view in side elevation of the socket construction that is employed for receiving the cover of a watthour meter while it is being tested.

Figure 4:
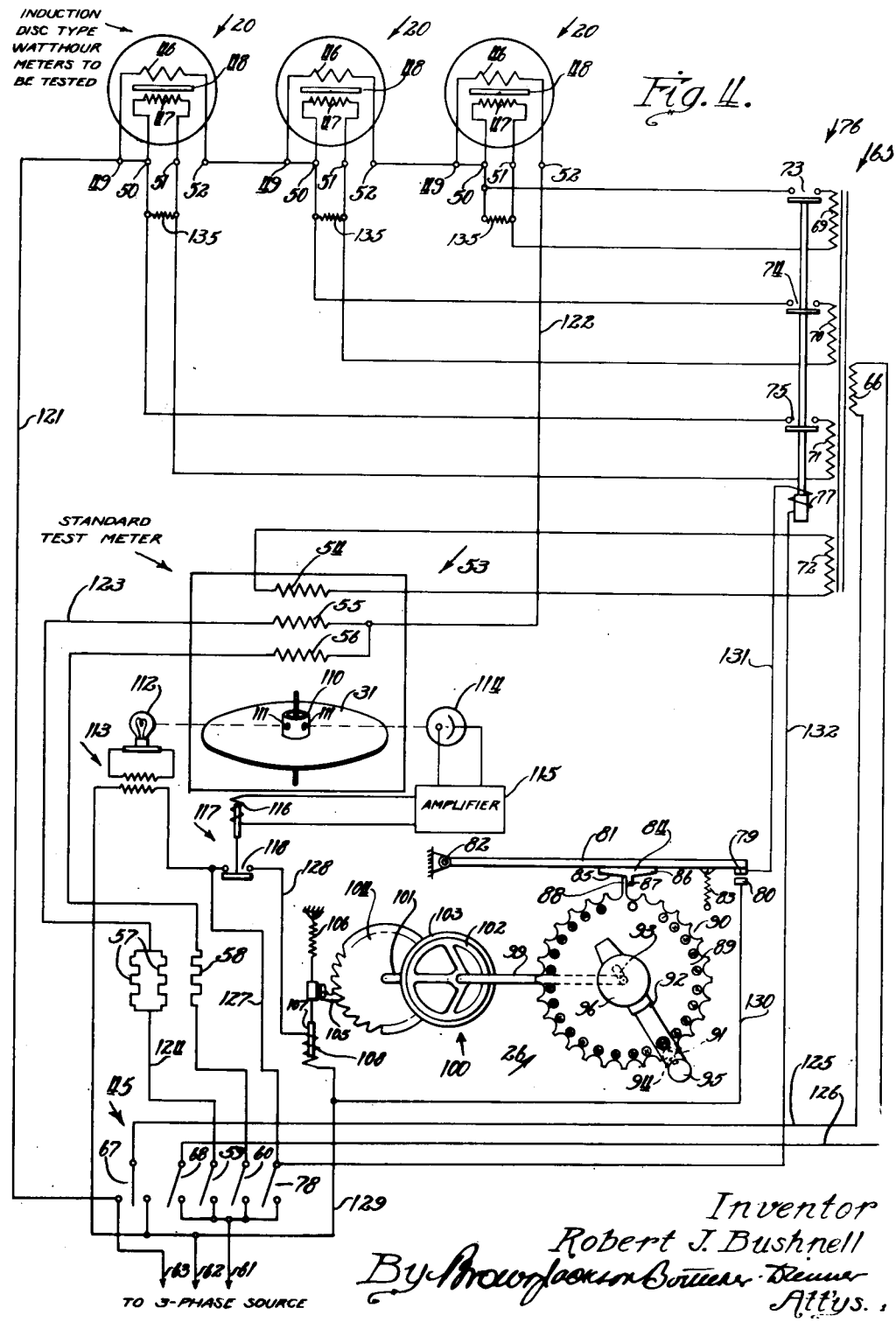
Figure 4 illustrates, diagrammatically, the circuit connections that can be employed in practicing the present invention.

Referring now particularly to Figure 1 of the drawings, it will be observed that the reference character 10 designates, generally, a test bench which comprises uprights 11, a horizontally extending shelf 12 and a cabinet body 13. It will be understood that a meter tester sits in front of the shelf 12 to perform the meter testing operations. If desired, the test bench 10 can be of duplex construction with duplicate apparatus and arrangement of parts being provided on the rear of the test bench as well as on the front which is shown in the drawings.

Slidably mounted in the cabinet body 13 are drawers 14 having drawer pulls or handles 14' for moving them. The drawers 14 are provided for containing tools and various equipment such as air hose and the like for use in testing and adjusting meters.

Centrally located in the cabinet body 13 are three panels 15, 16 and 17 of insulating material such as "Bakelite." The panels 15, 16 and 17 are angularly related, as illustrated, so as to be substantially equidistant from the meter tester who sits or stands in front of the shelf 12.

Each of the panels 15, 16 and 17 is provided with a meter test block 18 that carries spring pressed terminals 19 for contact engagement with corresponding terminals of induction disc type watthour meters such as that illustrated generally at 20. As is well known, the conventional type of watthour meters is provided with a terminal block, such as indicated at 21, having terminals for connection to the line and load conductors. It will be readily understood that the spring terminals 19 of the test block 18 engage the terminals of the terminal block 21 to provide connections which are similar to the connections to the meter 20 under service conditions.

While only three panels 15, 16 and 17 have been shown for receiving three meters 20 to be tested, it will be understood that a larger number of panels can be provided if desired. However, it has been found that the provision for the simultaneous testing of three meters 20 is satisfactory and that the number of meters which can be tested by a meter tester in a given interval would not be substantially increased if more than this number of meters could be tested at the same time.

Immediately in front of the shelf 12 there is provided an inclined panel 24 of suitable insulating material, such as "Bakelite" and it is arranged to interfit with the lower ends of the panels 15, 16 and 17, which carry the meter test blocks 18. The panel 24 is inclined so as to facilitate the work of the meter tester. In it are provided a window 25 and a base plate 26 of a revolution counter, the construction of which will be described in some detail hereinafter.

The window 25 forms a part of an optical system that is shown in detail in Figure 2 of the drawings. As there shown, the eye of the meter tester may be placed at 27 or somewhere along the broken line there indicated so that he can view a mirror 28 which is underneath the window 25 and in front of a second mirror 29 that is positioned over an indicator hand 30, which is rotated with a disc 31 of a standard test watthour meter. A lamp 32 illuminates the indicator 30 and permits visual observation thereof through the window 25 by means of the mirrors 28 and 29.

Above each of the panels 15, 16 and 17 in the cabinet body 13 there is provided a meter cover receptacle, indicated generally at 35. The receptacles 35 are provided for receiving the covers of the meters, one being indicated at 36, which must be removed while the meters are being tested in order to permit access to the interior for cleaning and adjustment of the parts. In the great majority of modern meters the covers 36 are formed largely of glass. Care must be taken of the covers while they are removed from the meters so as to prevent breakage. Also, it is desirable to return the same cover to the meter from which it was removed. It is also customary to provide a rim 37 at the base of each cover 36 which projects radially therefrom. The rim 37 is employed in connection with the frame of the meter for holding the cover in place thereon.

The meter cover receptacle 35 comprises a generally semicircular frame 38 that is formed of suitable insulating material such as "Bakelite." The frame 38 provides an aperture 39 for receiving a lower portion of the meter cover 36. Slots 40 are provided in the frame 38 for interfitting with the rim 37, as is more clearly shown in Figure 3 of the drawings. Since the frame 38 is mounted at an incline, the lower rear portion of the cover 36 only is required to be inserted therein, it being held in place by the rim 37 interfitting with the slots 40.

A flap 41, also formed of suitable insulating material, such as "Bakelite" is provided for automatically closing the aperture 39 in the absence of the meter cover 36. A spring hinge 42 serves to bias the flap 41 to the closed position. It will be readily understood that when the lower part of the rim 37 engages the face of the flap 41, it will be moved to the position shown in Figure 3 when the meter cover 36 fully occupies the receptacle 35.

Mounted on the shelf 12 are various control switches, indicated generally at 45, which are operated by the meter tester during the testing of the meters. The circuit connections to the switches 45 will be described in detail hereinafter.

The system for testing the meters will now be described in conjunction with the diagrammatic showing thereof in Figure 4 of the drawings. It will be noted that the three watthour meters 20 to be tested are illustrated diagrammatically and that each is provided with a current winding 46, a potential winding 47 and a disc 48. As is well known to those skilled in the art, the disc 48 is caused to revolve when the windings 46 and 47 are energized in the proper phase relationship, the number of revolutions of the disc 48 corresponding to the amount of energy that has passed through the meter. The windings 46 and 47 are connected to terminals 49, 50, 51 and 52 which terminals are contained in the terminal block 21, shown in Figure 1 of the drawings. It is to these terminals that the test terminals 19 of the test blocks 18 are connected when the meters are placed in the test position on the test bench 10. Ordinarily, the terminals 49 and 50 of the meters 20 are strapped together to provide a common connection for the current and voltage windings 46 and 47.

The operation of the meters 20 is to be compared to the operation of a standard test meter illustrated generally at 53. It will be understood that the standard test meter 53 is substantially a laboratory instrument whose operation can be precisely adjusted so that it possesses a high degree of accuracy. Such refinements of course are not feasible in the meters 20 which are to be tested since they are employed in large numbers for metering installations at houses, apartments, industrial establishments and the like and must of necessity be relatively inexpensive. However, it is essential that the meters 20 accurately register the amount of energy flowing through them within certain prescribed limits. In order to check this accuracy the operation of the meters 20 is compared to the operation of the standard test meter 53.

Essentially the test is made by simultaneously energizing the meters 20 to be tested and the standard test meter 53. The disc 31 of the standard test meter 53, previously referred to in connection with the optical system shown in Figure 2, is permitted to rotate a predetermined number of times, for example ten times, after which the potential windings 47 of the meters are deenergized. In the interval during which the disc 31 of the standard test meter 53 rotated ten times, the discs 48 of the meters 20 being tested should have rotated an equal number of times or some direct function thereof depending upon the meter constants. Assuming that each of the discs 48 should rotate ten revolutions while the disc 31 of the standard test meter 53 is rotating a like number of revolutions, then the extent that the final position of any of the discs 48 differs from the position which they would have occupied had they rotated through exactly ten revolutions, is an indication of the degree of inaccuracy of calibration of the meter. That is, if the final position of any of the discs 48 is either a few degrees ahead of or behind the position corresponding to a movement through ten revolutions, then the meter will accordingly register high or low.

It will be observed that the standard test meter 53 is provided with a potential winding 54 and two current windings 55 and 56. The winding 55 is provided for testing under full load conditions while the winding 56 is provided for testing under light load conditions. Resistors 57 are provided in the circuit to the full load winding 55 while a single resistor 58 is provided in the circuit to the light load winding 56. Switches 59 and 60, forming a part of the group of switches 45, previously referred to, are provided for selectively connecting the windings 55 and 56 to one conductor 61 of a three phase circuit comprising conductors 61, 62 and 63 which it will be understood are connected to a suitable source of three phase alternating current of a conventional frequency such as sixty cycles per second.

The potential windings 47 of the meters 20 and the potential winding 54 of the standard test meter 53 are arranged to be energized by a transformer, shown generally at 65, which has a primary winding 66 that is arranged to be connected by switches 67 and 68 to the conductors 61, 62 and 63. The switch 67 serves to connect the primary winding 66 to either the conductor 63 or conductor 62 to provide for testing the meters 20 either at unity power factor conditions or under highly inductive load conditions as will be readily understood.

The transformer 65 is provided with secondary windings 69, 70, 71 and 72. The windings 69, 70 and 71 are connected by means of contact members 73, 74 and 75, respectively, of a relay shown generally at 76, to the potential windings 47 of the meters 20. This individual connection of the potential windings 47 permits the application of the same voltage across the windings 47 without requiring that the common connection between the terminals 49 and 50 be opened as would otherwise be necessary if the potential windings 47 were connected in parallel circuit relation to a common source.

The relay 76 is provided with an operating winding 77 the energization of which is controlled in part by a manually operated switch 78 and in part by contact members 79 and 80 which are normally held apart as illustrated.

The contact members 79 and 80 are arranged to be closed only while the disc 31 of the standard test meter 53 is rotating through the predetermined number of revolutions which forms the test period as previously described. That is, the contact members 79 and 80 are arranged to be closed at the beginning of this series of revolutions and to be opened upon the completion thereof. For this purpose the revolution counter 26, previously referred to, is provided. The mechanical details of construction of the revolution counter are more completely set forth in the copending application of Virgil S. Hardey, Serial No. 353,480, filed August 21, 1940, and, therefore, they are only illustrated diagrammatically here since they form no part of the present invention except as they enter into the general combination.

It will be understood that the contact member 80 is stationarily mounted. The contact member 79 is carried by an arm 81 which may be pivoted at 82 and biased downwardly by a coil tension spring 83. The arm 81 carries a cam member 84 having cam surfaces 85 and 86 on opposite sides of a stop 87. A detent 88 which is carried by a disc 89 abuts the stop 87 and in sliding over the cam surface 85 when the disc 89 is rotated in clockwise direction serves to lift the contact member 79 away from the contact member 80. The movement of the disc 89 in a counterclockwise direction is accompanied by a movement of the detent 88 away from the stop 87 and at the same time the detent 88 moves over the cam surface 85 thereby permitting the arm 81 to move downwardly until the contact member 79 engages the contact member 80.

The disc 89 is provided about its periphery with semi-circular notches 90 in which a detent 91, generally semi-circular in shape, is arranged to cooperate. The detent 91 is carried by an arm 92 which is slotted as indicated at 93 to permit relative radial movement with respect to the disc 89 so that the detent 91 can be moved out of any of the semi-circular notches 90 to permit movement of the arm 92 to another position. It will now be understood that the arm 92 is movable with the disc 89 when the detent 91 engages any of the semi-circular notches 90. When the arm 92 is moved radially so as to cause the detent 91 to clear the periphery of the disc 89, then the arm 92 is free to rotate relative to the disc 89. It will be noted that certain of the semi-circular notches 90 are numbered. Each number corresponds to the number of revolutions of the disc 31 required to effect separation of the contact members 79 and 80 once they have been closed on initiating a test sequence of operations.

Associated with the detent 91 and movable with the arm 92 is another detent 94 which is similar to the detent 88 that is carried by the disc 89 and it is arranged to rotate in the same plane. The detent 94 is arranged to engage the cam surface 86 and lifts the arm 81 to separate the contact members 79 and 80. When the detent 94 engages the stop 87 further movement of the disc 89 in a counterclockwise direction is prevented.

In order to facilitate movement of the arm 92, it is provided with a knob 95 which can be readily grasped by the hand of the meter tester to adjust the position of the arm 92 as desired. A larger knob 96 is fastened to the disc 89 to rotate the same to the starting position.

The disc 89 is mounted for rotation with a shaft 99 that is driven through a friction coupling, shown generally at 100, by a shaft 101. The friction coupling 100 is of conventional construction and comprises a spring washer 102 that is fastened to the shaft 99 and a friction disc 103 that is fastened to the shaft 101. The friction coupling 100 permits continued rotation of the shaft 101 after further rotation of the shaft 99 is prevented by engagement of the detent 94 with the stop 87.

The shaft 101 is driven by a ratchet wheel 104 with which a pawl 105 cooperates. A coil tension spring 106 serves to retract the pawl 105 while an armature 107 is provided for advancing it. The armature 107 is under the control of a winding 108. The winding 108 is arranged to be energized once during each revolution of the disc 31 of the standard test meter 53 so as to advance the ratchet wheel 104 one notch. A corresponding movement of the disc 89 in a counterclockwise direction simultaneously takes place.

Of course it is undesirable to place any load on the disc 31 of the standard test meter 53 for operating the counting mechanism since such load would tend to impair the accuracy of the instrument. Accordingly, an inertia-less means has been provided for counting the revolutions of the disc 31. For this purpose a sleeve 110 is coaxially mounted on the disc 31 and it is provided with registering apertures 111 in its side wall as illustrated. The sleeve 110 is arranged to obstruct the light rays from a lamp 112, which may be energized by suitable means such as by a transformer shown generally at 113, falling on a light sensitive device such as a photo-electric cell 114. Only when the apertures 111 are in line with the light source 112 and the photo-electric cell 114 is light permitted to fall on the latter. Since the apertures 111 occupy this position only once during each revolution of the disc 31, it will be apparent that light falls on the photo-electric cell 114 only once during each revolution. The photo-electric cell 114 is connected to a suitable electronic amplifier 115 of conventional form so as to control the energization of a winding 116 of a control relay 117. The control relay 117 is provided with normally open contact members 118 which are closed on energization of the winding 116.

In describing the functioning of the invention herein disclosed, it will be assumed that three meters 20 have been placed on the test blocks 18, Figure 1 of the drawings. Each of the covers 36 will then be removed and placed in the corresponding meter cover receptacle 35. If the meters are dusty, then they may be subjected to a blast of air to remove the dust. Each of the discs 48 is placed in the same position usually with the marker thereon in the most forward position so that the subsequent position thereof can be checked after the test has been completed.

It will be assumed that the test is to be carried out while the disc 31 of the standard test meter 53 rotates through ten revolutions. Accorrdingly, the arm 92 will be placed in the position shown in Figure 4 of the drawings with the detent 91 in the semi-circular notch 90 numbered 10. Prior to the beginning of the test the detent 88 abuts the stop 87 and holds the contact member 79 away from the contact member 80.

If the full load test is to be made then switch 59 is closed. The current windings 46 and 55 of the meters 20 and 53 are then connected in series circuit relation through the resistors 57 and across the conductors 61 and 63. This circuit can be traced from the conductor 63 through conductor 121, current windings 46 connected in series, conductor 122, winding 55, conductor 123, load resistors 57, conductor 124 and switch 59 to conductor 61.

Switch 78 is closed to partly complete the energizing circuit for the operating winding 77 of the relay 76 as well as for the operating winding 108 which serves to attract the armature 107.

It will be assumed that the test is to be carried out at unity power factor. Accordingly, the switch 67 will be operated to its left hand position and the switch 68 will be closed. The primary winding 66 will now be energized over a circuit which can be traced from the energized conductor 63 through the switch 67, conductor 125, primary winding 66, conductor 126 and switch 78 to the energized conductor 61.

It will be observed that, while all of the secondary windings 69, 70, 71 and 72 are now energized, only the winding 72 is effective to energize the potential winding 54 of the standard test meter 53 while the other secondary windings are ineffective to energize their corresponding potential windings 47 since the relay 76 is in the open position.

As a result of the energization of the potential winding 54 of the standard test meter 53, the disc 31 begins to rotate under load conditions which are exactly the same as will presently be applied to the meters 20 to be tested. As soon as the sleeve 110 is moved to such a position that light rays from the source 112 impinge upon the photo-electric cell 114, the winding 116 of the relay 117 is energized and contact members 118 are closed. The winding 108 is then energized over a circuit which can be traced from the energized conductor 61 through switch 78, conductor 127, contact members 118, conductor 128, winding 108 and conductor 129 to energized conductor 62.

On energization of the winding 108 the armature 107 is attracted and carries with it the pawl 105, thereby advancing the ratchet wheel 104 one notch. A corresponding movement of the disc 89 takes place and the detent 88 moves away from the stop 87 and along the cam surface 85. The initial movement is sufficient to permit the contact members 79 and 80 to close, thereby energizing the winding 77 of the relay 76 over a circuit which can be traced from the energized conductor 62 through conductors 129 and 130, contact members 80 and 79, conductor 131, winding 77, conductor 132 and switch 78 to the energized conductor 61.

The relay 76 is now energized and contact members 73, 74 and 75 thereof are closed to connect the secondary windings 69, 70 and 71 across the corresponding potential windings 47 of the meters 20. The discs 48 of the meters 20 then begin to rotate as will be readily understood.

Returning now to the functioning of the disc 31 of the standard test meter 53, it will be understood that as soon as the apertures 111 have moved out of registry with the source 112 and the photo-electric cell 114, the latter is no longer energized and accordingly the winding 116 of the relay 117 is deenergized. The contact members 118 of the relay 117 are then opened, winding 108 is deenergized and the spring 106 pulls the pawl 105 back to a position in engagement with the next tooth of the ratchet wheel 104. On the next revolution of the disc 31 the ratchet wheel 104 is advanced a second notch and a corresponding movement of the disc 89 takes place.

At the end of the tenth revolution of the disc 31 under the conditions here assumed, the detent 94 will engage the cam surface 86 and lift the contact member 79 out of engagement with the contact member 80 coming to rest against the stop 87. The energizing circuit for the winding 77 is then opened and contact members 73, 74 and 75 are thereupon opened as a result of which the potential windings 47 of the meters 20 are deenergized and no further rotation of the discs takes place.

The continued rotation of the disc 31 of the standard test meter 53 merely advances the ratchet wheel 104 but now because of the friction coupling 100, this movement is not transmitted to the disc 89 which is prevented from further rotation in a counterclockwise direction by engagement of the detent 94 with the stop 87.

The meter tester then notes the final positions of the discs 48 and, if necessary, makes necessary adjustments on the meters 20 to correct for under or over registration. If necessary, the test can be repeated under the same conditions.

It will be apparent that the meter tester does not have to carefully watch the meters 20 while they are being tested so as to insure that the discs 48 rotate through any desired predetermined extent. Once he has initiated the test sequence, he can leave the test bench and while it is being carried out, he can be preparing additional meters for test. At the completion of the test, the meters 20 are automatically deenergized as described in so far as their potential windings 47 are concerned, so that at his convenience the meter tester can then open the switches 59 and 68 to deenergize the current and potential ciricuts if he so desires.

If the test is to be made under light load conditions, then the switch 60 instead of the switch 59 is closed. Load resistor 58 is then connected in series circuit relation with the light load winding 56 of the standard test meter 53 as will be readily understood.

If the test is to be conducted under lagging power factor conditions, then the switch 67 is operated to the right to connect the potential circuit to the conductor 62 instead of to the conductor 63.

In some instances the burden placed by the potential winding 54 on the secondary winding 72 of the transformer 76 may be greater than the burden placed on the other secondary windings 69, 70 and 71 by the potential windings 47 of the meters 20. This may introduce a slight phase angle error which can be corrected by connecting inductive windings 135 across the potential windings 47 as shown. The combined impedance of each set of windings 47 and 135 is preferably equal to the impedance of the potential winding 54.

Since certain changes can be made in the foregoing construction and circuit arrangements and different embodiments of the invention can be made without departing from the scope thereof, it is intended that all matter shown in the accompanying drawings and described hereinbefore shall be interpreted as illustrative and not in a limiting sense.

I claim as my invention:

1. Watthour meter testing apparatus comprising, in combination, means for receiving a plurality of watthour meters of the induction disc type to be tested, a standard watthour meter of the induction disc type, and means for simultaneously energizing said watthour meters to be tested during a predetermined number of revolutions of the disc of said standard watthour meter, the displacement of each disc of the meters tested from a given position indicating the degree of inaccuracy of the same.

2. Watthour meter testing apparatus comprising, in combination, means for receiving a plurality of watthour meters of the induction disc type to be tested, a standard watthour meter of the induction disc type, means for simultaneously energizing said watthour meters to be tested when the disc of said standard watthour meter occupies a predetermined position, and means for deenergizing the tested watthour meters when the disc of said standard watthour meter subsequently occupies a predetermined position, the displacement of each disc of the meters tested from a given position indicating the degree of inaccuracy of the same.

3. Watthour meter testing apparatus comprising, in combination, means for receiving a plurality of watthour meters of the induction disc type to be tested, a standard watthour meter of the induction disc type, means for simultaneously energizing said watthour meters to be tested when the disc of said standard watthour meter occupies a predetermined position, means for counting the revolutions of the disc of said standard watthour meter, and means operated by said counting means for deenergizing the tested watthour meters after a predetermined number of revolutions of the disc of said standard watthour meter, the displacement of each disc of the meters tested from a given position indicating the degree of inaccuracy of the same.

4. Watthour meter testing apparatus comprising, in combination, means for receiving a plurality of watthour meters of the induction disc type to be tested, switch means individual to each watthour meter and an operating winding common thereto for connecting said watthour meters simultaneously for energization to an alternating current source, a standard watthour meter of the induction disc type, means controlled by the disc of said standard watthour meter for energizing said operating winding, means for counting the revolutions of the disc of said standard watthour meter, and means operated by said counting means for deenergizing said operating winding after a predetermined number of revolutions of the disc of said standard watthour meter, the displacement of each disc of the meters tested from a given position indicating the degree of inaccuracy of the same.

5. Watthour meter testing apparatus comprising, in combination, means for receiving a plurality of watthour meters of the induction disc type to be tested, a potential transformer having a primary winding adapted to be connected to an alternating current source and a plurality of secondary windings each individual to a watthour meter, switch means individual to each watthour meter and an operating winding common thereto for connecting said watthour meters simultaneously for energization to their corresponding secondary windings, a standard watthour meter of the induction disc type, means controlled by the disc of said standard watthour meter for energizing said operating winding, means for counting the revolutions of the disc of said standard watthour meter, and means operated by said counting means for deenergizing said operating winding after a predetermined number of revolutions of the disc of said standard watthour meter, the displacement of each disc of the meters tested from a given position indicating the degree of inaccuracy of the same.

6. Method of simultaneously testing a plurality of watthour meters of the induction disc type using a standard watthour meter of the same type which comprises: energizing the standard watthour meter, simultaneously energizing the watthour meters to be tested when the disc of the standard watthour meter occupies a predetermined position, counting the number of revolutions of the disc of said standard watthour meter, and deenergizing the tested watthour meters after a predetermined number of revolutions of the disc of said standard watthour meter.

7. In apparatus for testing watthour meters having covers with projecting rims around their bases, in combination, means for receiving a watthour meter and connecting the same for test purposes, means for receiving the cover of the watthour meter to be tested, and means cooperating with the rim of the cover for holding the same in said cover receiving means.

8. In apparatus for testing watthour meters having covers with projecting rims around their bases, in combination, means for receiving a watthour meter and connecting the same for test purposes, and means providing an aperture through which a portion of the cover including its rim projects, said aperture being shaped so as to provide flange means for interfitting with said rim to hold said cover in place therein.

9. In apparatus for testing watthour meters having covers with projecting rims around their bases, in combination, means for receiving a watthour meter and connecting the same for test purposes, means providing an aperture through which a portion of the cover including its rim projects, said aperture being shaped so as to provide flange means for interfitting with said rim to hold said cover in place therein, a flap covering said aperture, and resilient means biasing said flap to closed position, said flap adapted to be engaged by the cover and moved to open position on insertion of the same in said aperture.

ROBERT J. BUSHNELL.